Sept. 23, 1952 J. L. FOSTER 2,611,663

SELF-ALIGNING BEARING

Filed Feb. 2, 1950

Inventor
JAMES LESLIE FOSTER

By: Spencer, Johnston, Cook & Root
attys

Patented Sept. 23, 1952

2,611,663

UNITED STATES PATENT OFFICE 2,611,663

SELF-ALIGNING BEARING

James Leslie Foster, La Porte, Ind., assignor to U. S. Slicing Machine Company, Inc., La Porte, Ind., a corporation of Indiana Application February 2, 1950, Serial No. 141,916

6 Claims. (Cl. 308—2)

This invention relates in general to a pivot and bearing arrangement and more particularly to a self-aligning knife edge pivot and grooved bearing combination and a support therefor especially adapted for use in weighing scales.

It is well known that a bearing having a V-shaped groove adapted to receive a knife edge pivot should be mounted so that the knife edge assumes a position in which the line at the apex of the groove in the bearing and the knife edge coincide. If the pivot and bearing are out of alignment when the knife edge pivot is mounted in the groove of the bearing, only a part of the knife edge engages the apex of the groove. This may cause chipping of the pivot or of the bearing, thus resulting in decreased accuracy of the weighing scale or other device upon which the knife edge pivot is employed. The proper mounting and alignment of the knife edge and its associated bearing, therefore, must be done very carefully.

An object of the invention is to provide a pivot bearing and mounting therefor which may be easily adjusted into position in a weighing device.

Another object of the invention is to provide a knife edge pivot bearing and mounting therefor in which the bearing is free to position itself in alignment with the knife edge of the pivot.

A further object of the invention is to provide a mounting for a pivot bearing which will maintain the bearing against translation or bodily shifting movement which would result in displacement of the bearing with respect to the pivot.

A still further object of the invention is to provide a mounting for a knife edge pivot bearing which is easily adjustable to provide a snug fit between the bearing and its mounting after the knife edge and bearing are in alignment.

These and other objects and advantages of the invention will be more apparent from a consideration of the following description and drawings in which.

Figures 1, 2, 3:
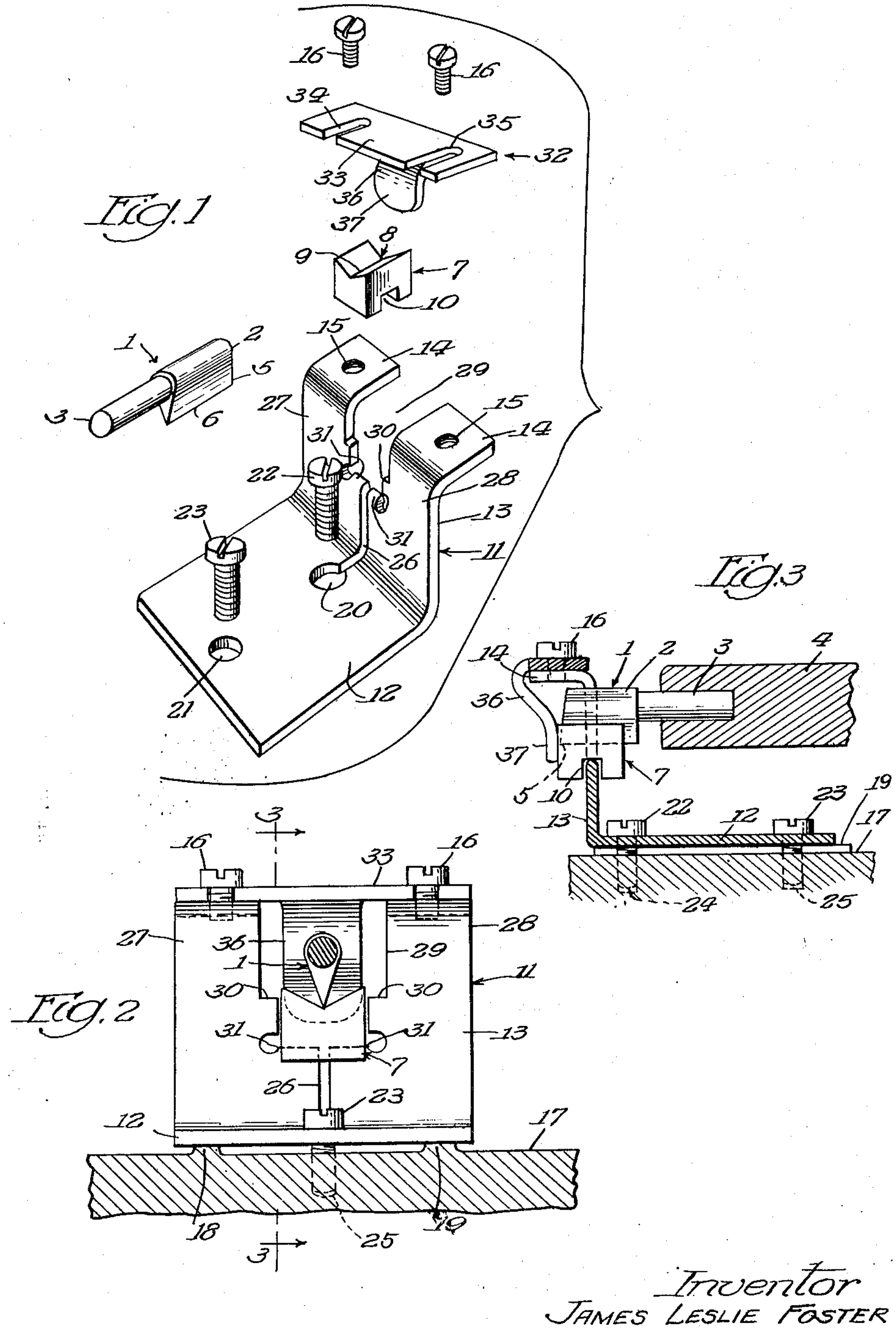
Figure 1 is an exploded perspective view of the bearing, pivot, and bearing support.
Figure 2 is an end view of the mounted bearing assembly shown from the inside.
Figure 3 is a sectional view taken along the line 3—3 of Figure 2.

The invention resides in a novel means for mounting a self-aligning bearing in which the bearing is held against unnecessary bodily shifting movement while still being free to execute the limited movement necessary for self-alignment.

The novel means for mounting the bearing comprises a pair of cooperating arms disposed on opposite sides of the bearing which are adapted to be brought together in a pinching movement at the one end by means of a force applied adjacent the opposite end. The pinching movement is accomplished by bowing a plate having the arms attached to opposite sides of the plate.

Referring to the drawings, the pivot member 1 comprises a knife portion 2 on the one end and a rounded stub shaft portion 3 at the other end. The knife portion 2 is adapted to be supported on the bearing hereinafter described while the stub shaft portion 3 is adapted to be rigidly secured to a weigh beam or lever 4 (Figure 3). The free end of the knife portion 2 has a beveled surface tapered downwardly and outwardly to a point 5 which coincides with the knife edge 6 of the knife portion 2. The point 5 is commonly referred to as a thrust point.

The bearing or knife rest 7 upon which the knife portion 2 is adapted to be mounted is substantially in the form of a rectangular block and may be made of agate, hard glass, hardened metal or any other suitable material. The upper surface of the bearing or knife rest 7 has a V-shaped groove 8 extending longitudinally of the bearing. The apex 9 of the groove 8 is straight, all points thereon being in the same plane. The lower surface of the bearing or knife rest 7 has a recess 10 extending transversely of the bearing, said recess being adapted to engage the bearing support member 11.

The bearing support member 11 has a flat rectangular base portion 12. An upright portion 13 is integrally connected to one end of the base portion 12 and extends upwardly substantially at right angles to the base portion 12. The projecting arms 14, 14 are disposed in a plane approximately parallel to that of the base portion 12 and are provided with tapped holes 15, 15 to receive machine screws 16, 16.

The entire bearing support 11 rests upon the machine base 17 and more particularly upon bosses 18 and 19 on the machine base 17. The bosses 18 and 19 are adapted to engage the underside of the base portion 12 of the bearing support 11 near the opposite side edges thereof. A pair of vertical openings or bores 20, 21 are provided in the longitudinal center of the base portion 12 through which bolts or machine screws 22, 23 may be inserted. The bolts or machine screws 22, 23 are adapted to be screwed into a pair of vertical tapped holes 24, 25 respectively which are formed in the machine base 17 half way between the bosses 18 and 19. The base portion 12 is suitably made of a heavy metal which is capable of being bent slightly at the middle when a considerable force is exerted thereon. Since the edges of the base portion 12 are supported by the bosses 18 and 19 it is apparent that tightening the machine screws 22 and 23 will cause the heads of said screws to bow the center of the base downwardly with respect to the side edges thereof.

An elongated slot or passageway 26 divides the upright member 13 into a pair of upright supporting arms 27 and 28. The slot or passageway 26 extends from the opening or bore 20 in the base portion and through the upright member 13 to a point where it widens to form a bearing recess or slot 29 between the upright supporting arms 27 and 28. Each of the supporting arms 27 and 28 is provided with a projection 30 extending into the bearing recess 29 and adapted to guide the bearing or knife rest 7 when the parts are assembled. Each of the upright arms 27 and 28, at the lower end of the bearing recess or slot 29, is provided with a vertical projection 31 having a rounded upper edge upon which the bearing or knife rest 7 is adapted to rest.

The bearing or knife rest 7 may be assembled on the bearing support member 11 by inserting the bearing or knife rest into the bearing recess 29 so that the rounded upper edges of the projections 31, 31 support the said bearing at the upper end of the recess 10 formed therein. The recess 10 preferably is slightly wider than the thickness of the projections 31, 31 so that the bearing may rock longitudinally on the rounded edges of said projections to a limited extent. The upright arms 27 and 28 are integrally connected with the base portion 12 in such fashion that bowing the base downwardly at the middle will cause the upright arms to move toward one another progressively from their lower portions to their upper portions. Thus the arms move toward each other so as to decrease the area between the projections 30, 30. When the bearing or knife rest 7 is positioned on the supporting projections 31, 31, the positions of the supporting arms are preferably adjusted so that the bearing is free to rock on the projections 31, 31 but is prevented from moving transversely or laterally by the projections 30, 30.

A retaining member 32 is provided for preventing the pivot member 1 from shifting longitudinally on the bearing or knife rest 7. The retaining member 32 consists of a flat portion 33 having a pair of elongated slots 34 and 35 near either end thereof. The portion 33 is adapted to rest upon the top of the projecting arms 14, 14 of the bearing support member 11 and to be rigidly secured thereto by means of the screws 16, 16. Integrally associated with the portion 33 is a projecting arm 36 which is curved to extend under the flat portion 33. The lower end of the projecting arm 36 forms a hardened thrust plate 37 which is arranged in a plane parallel to the upright portion 13. The hardened thrust plate 37 is adapted to engage the thrust point 5 of the pivot member 1 to prevent endwise movement of the pivot member in one direction.

One advantage of the invention is that the mounting for the bearing may be formed as a stamping in one piece from sheet metal. Adjustment of the bearing within the mounting is far simpler than anything heretofore known. The freedom of the bearing to move laterally initially permits the self-alignment of the knife edge with the apical portion of the bearing groove. The simple expedient of tightening the screws on the base plate of the mounting insures a snug fit between the bearing and its associated mounting without disturbing the aligned position of the bearing and the knife edge.

The invention is hereby claimed as follows:

1. A self-aligning bearing device of the class described comprising a bearing adapted to serve as a bearing for a pivot member, mounting means for said bearing comprising means laterally disposed with respect to said bearing and adapted to engage said bearing on at least two sides thereof when force is applied thereto, a base plate integrally associated with said laterally disposed means, means for supporting said base plate adjacent its edges and means for applying force to a central portion of said base plate thereby causing said laterally disposed means to move toward each other and provide a snug fit with said bearing.

2. A bearing device of the class described comprising a bearing having a pivot seat extending longitudinally along one surface thereof and a recess on the opposite surface thereof, a mounting for said bearing comprising a pair of spaced upwardly extending arms, a support associated with said recess of said bearing between said arms, a base plate connected to the ends of said arms and provided with a passageway connected to the space between said arms, means for supporting said base plate on opposite sides of said passageway while permitting said base plate to be bowed downwardly adjacent said passageway, and means to bow said base plate downwardly adjacent said passageway to move said spaced arms toward each other and to increase the snugness of the fit of said bearing in said mounting.

3. A self-aligning knife edge pivot and bearing assembly comprising a bearing having a notch extending longitudinally along one surface thereof and a groove extending transversely on the opposite surface thereof, a knife edge pivot seated in said notch, a mounting for said bearing comprising a pair of spaced upwardly extending arms, a support for said groove of said bearing between said arms, a base plate connected to the ends of said arms and provided with a passageway extending to the space between said arms, means for supporting said base plate adjacent its edges, and means to bow said base plate interiorly to move said spaced arms toward each other to increase the snugness of the fit of said bearing in said mounting.

4. A self-aligning knife edge pivot and bearing assembly comprising a bearing having a notch extending longitudinally along one surface thereof and a groove extending transversely on the opposite surface thereof, a knife edge pivot seated in the said notch, a mounting for said bearing comprising a pair of spaced unwardly extending arms, a support for said groove of said bearing between said arms, a base plate connected to the lower ends of said arms, a support for said base plate, means associated with said base plate and said support to bow said base plate downwardly causing said spaced upright arms to be moved toward each other against opposite sides of the bearing to increase the snugness of the fit of said bearing in said mounting, a thrust member mounted on said arms, and means to position said thrust member to adjust the endwise and pivotal movement of said bearing.

5. A self-aligning knife edge pivot and bearing assembly comprising a bearing having a V-shaped notch extending longitudinally along one surface thereof and a U-shaped groove extending transversely on the opposite surface thereof, a knife edge pivot seated in the apex of said V-shaped notch, a stamped metal mounting for said bearing comprising an upwardly extending portion having a pair of spaced upright arms, each arm being formed with a projection on which a portion of said U-shaped groove of said bearing rests between said arms and a projection extending toward one of the opposite sides of said bearing, a base plate integrally connected to the lower ends of said arms, a support for said base plate including raised portions engaging the base plate adjacent the sides thereof, the central portion of said base plate being unsupported and being provided with at least one hole connected by a passageway with the space between said arms, means comprising a screw passing through said hole in said base plate and a threaded portion in said support tightened to bow said base plate downwardly causing said spaced upright arms to be moved toward each other until said projections extending toward said opposite sides of said bearing press against opposite sides of the bearing sufficiently to increase the snugness of the fit of said bearing in said mounting and prevent lateral movement of the bearing while permitting some longitudinal movement, a projection extending from the top of each of said upright arms, a thrust plate seated on said projections having a downwardly and inwardly extending thrust member opposite said bearing, a pair of slots in said thrust plate and a corresponding pair of threaded holes in said upright arms, and a screw in each of said holes passing through its associated slot tightened to hold said thrust plate with said thrust member positioned to limit the endwise and pivotal movement of said bearing.

6. A self-aligning knife edge pivot and bearing assembly comprising a bearing having a V-shaped notch extending longitudinally along one surface thereof and a U-shaped groove extending transversely on the opposite surface thereof, a knife edge pivot seated in the apex of said V-shaped notch, a mounting for said bearing comprising an upwardly extending portion having a pair of spaced upright arms, a lower portion of each arm being formed with a projection on which a portion of said U-shaped groove of said bearing rests between said arms, a base plate integrally connected to the lower ends of said arms, a support for said base plate including raised portions engaging the base plate adjacent the sides thereof, the central portion of said base plate being unsupported, means comprising a screw passing through said base plate and a threaded portion in said support tightened to bow said base plate downwardly causing said spaced upright arms to be moved toward each other against opposite sides of the bearing to increase the snugness of the fit of said bearing in said mounting and prevent lateral movement of the bearing while permitting some longitudinal movement, a projection extending from the top of each of said upright arms, a thrust plate seated on said projections having a downwardly and inwardly extending thrust member opposite said bearing, a pair of slots in said thrust plate and a corresponding pair of threaded holes in said upright arms, and a screw in each of said holes passing through its associated slot tightened to hold said thrust plate with said thrust member positioned to limit the endwise pivotal movement of said bearing.

JAMES LESLIE FOSTER.

REFERENCES CITED

The following references are of record in the file of this patent:

UNITED STATES PATENTS

| Number | Name | Date |
|---|---|---|
| 555,768 | Heyer | Mar. 3, 1896 |
| 949,094 | Sonander | Feb. 15, 1910 |
| 1,426,393 | King | Aug. 22, 1922 |
| 2,256,318 | Hadley | Sept. 16, 1941 |